Patented July 30, 1935

2,009,775

UNITED STATES PATENT OFFICE 2,009,775

HYDRATION OF OLEFINES

Walter Philip Joshua, Cheam, Herbert Muggleton Stanley, Tadworth, and John Blair Dymock, Sutton, England No Drawing. Application December 22, 1933, Serial No. 703,673

7 Claims. (Cl. 260—156)

This invention relates to the conversion of olefines into alcohols and has particular but not exclusive reference to the conversion of ethylene into ethyl alcohol.

The conversion of ethylene into alcohol by absorption in strong sulphuric acid, dilution of the ethyl ester and distillation is known, as also is the direct combination of ethylene and steam under the catalytic influence of liquids especially sulphuric acid and under the influence of certain solid catalysts.

One of the objects of the present invention is to provide an improved process of conversion of olefines into alcohols and particularly ethylene into ethyl alcohol by means of steam in the presence of solid catalysts. A further object is to effect the direct conversion of olefines and steam into the corresponding alcohols, particularly ethylene and steam into ethyl alcohol, by the aid of certain complex catalysts containing boron.

With the above objects in view the conversion according to the present invention is conducted at elevated temperatures and preferably at moderately elevated pressure with the aid of a catalyst or catalysts containing boron together with copper or iron or manganese or any two or all of these, and phosphoric acid ($H_3PO_4$) in excess of that required to form the orthophosphates of the above mentioned elements respectively present.

The preferred method of operation is to circulate a mixture of the olefine and steam over a mass of the catalyst in granular or tabletted form spread along a tube and if desired dispersed in or on inert material or in other known catalytic material.

The reaction may be carried out at temperatures ranging from 100° C. to 350° C. and at pressures ranging from atmospheric up to about 250 atmospheres.

The following examples illustrate the manner of carrying the invention into effect and the results obtained:—

Example I

Ferrous oxalate, equivalent to 35.9 grams of FeO, was reacted with 191 grams of 90 per cent. phosphoric acid ($H_3PO_4$) and 17.4 grams of boron trioxide were added. The mass was finally baked at 170°–200° C. and broken into fragments of pea size.

Over 100 cc. of granules of this catalyst at 270° C. was passed as mixture of 3.4 mols. of ethylene and 1 mol. of steam under a total pressure of 20 atmospheres, and at a gas rate of approximately 400 litres per hour of ethylene calculated at normal temperature and pressure. The hourly output of ethyl alcohol was 6.69 grams in the form of a 6.90 per cent. aqueous condensate.

Example II

A mixture of 62.5 grams of $CuCO_3$, 17.5 grams of $B_2O_3$ and 164.9 grams of 90 per cent. phosphoric acid ($H_3PO_4$) were heated down to dryness and broken into pellets of pea-size.

Over 100 cc. of this catalyst at 270° C. was passed a mixture of 3.4 mols. of ethylene and 1 mol. of steam under a total pressure of 20 atmospheres at a gas rate of approximately 400 litres of ethylene per hour (calculated at normal temperature and pressure). The hourly output of alcohol was 7.87 grams in the form of 8.15 per cent. condensate. The conversion of ethylene into ethanol was 0.94 per cent. per passage.

Example III

A catalyst was prepared from 62.5 grams $CuCO_3$, 86.2 grams $MnCO_3$, 43.6 grams $B_2O_3$ and 464 grams of 90 per cent. $H_3PO_4$. The solid mass was baked at 200° C. for 2 hours and broken into granules of pea-size.

Over 100 cc. of this catalyst at 280° C. was passed a mixture of 3.0 mols. of ethylene and 1 mol. of steam at a total pressure of 20 atmospheres at a gas rate of about 400 litres per hour of ethylene (calculated at normal temperature and pressure). The hourly alcohol production was 9.11 grams in the form of an 8.53 per cent. aqueous condensate.

Example IV

A catalyst was prepared by evaporating down a mixture of $MnCO_3$, $B_2O_3$ and $H_3PO_4$ in the molecular proportions of 1 mol. MnO, 0.5 mol. $B_2O_3$ and 2.8 mols. phosphoric acid. About 3 per cent. of linseed oil was incorporated in the final stages of the evaporation and the resulting mass was powdered, tabletted in ¼″ tablets and finally baked at 200° C. for 2 hours. Over 100 cc. of this catalyst at 275°–290° C. was passed a mixture of ethylene and steam under a total pressure of 20 atmospheres and at a gas rate of about 400 litres of ethylene per hour calculated at normal temperature and pressure. The following table shows the influence of varying the steam-ethylene ratio and the concentration of alcohol in the aqueous condensate and the hourly output of alcohol obtained.

| Mols. of C₂H₄ per mol. of H₂O | Hourly output of C₂H₅OH grams | Percentage alcohol in condensate |
|---|---|---|
| 3.2 | 7.66 | 6.30 |
| 2.7 | 8.16 | 6.32 |
| 2.3 | 9.05 | 5.53 |
| 1.94 | 9.98 | 5.50 |
| 1.65 | 10.75 | 4.83 |
| 1.04 | 13.07 | 3.47 |

*Example V*

A catalyst of the composition 1 mol. MnO, 0.5 mol. B₂O₃ and 3.6 mols. H₃PO₄ was prepared by evaporating down the requisite quantities of MnCO₃, B₂O₃ and H₃PO₄ and adding 5 per cent. of linseed oil in the final stage of evaporation. The mass was powdered, baked at 250° C. for 2 hours and tabletted in ¼″ pellets with addition of about 3 per cent. linseed oil. The tablets were finally baked at 250° C. for 2 hours.

Over 100 cc. of this catalyst in a vertical tub there was passed at 280° C. under a total pressure of 20 atmospheres a mixture of 2.3 mols. of ethylene and 1 mol. of steam at a gas rate of approximately 400 litres of ethylene per hour calculated at normal temperature and pressure. The hourly output of ethyl alcohol was 10.19 grams in the form of a 6.30 per cent. aqueous condensate. No polymers were produced.

*Example VI*

Over 100 cc. of the catalyst at 290° C. described in Example V was passed under a total pressure of 40 atmospheres a mixture of 3 mols. of ethylene and 1 mol. of steam at a gas rate of about 1300 litres of ethylene per hour (calculated at normal temperature and pressure). The hourly output of alcohol was 48.0 grams in the form of a 11.48 per cent. aqueous condensate.

*Example VII*

Over 1000 cc. of the same catalyst as described in Example V and spread on trays and at a temperature of 280°-290° C. was passed a mixture of 2.2 mols. ethylene and 1 mol. of steam under 20 atmospheres pressure at a gas rate of about 10,000 litres of ethylene per hour calculated at normal temperature and pressure. The hourly output of alcohol was about 165 grams in the form of a 4.48 per cent. condensate.

*Example VIII*

92 grams of ferrous oxalate were evaporated with 284 grams of phosphoric acid until all organic matter was destroyed. 57.5 grams of manganese carbonate and 34.9 grams of boron trioxide were then added and the whole was dried and baked. Over 100 cc. of this catalyst at a temperature of 270° C. and at a total pressure of 20 atmospheres a mixture of ethylene and steam in the molecular proportions of 3.7 mols. of ethylene to 1 mol. of steam was passed at the rate of 400 litres of ethylene per hour calculated at normal temperature and pressure. The hourly output was 4.64 grams in the form of a 4.67 per cent. condensate.

The ethylene employed may be substantially pure or it may be merely a component of a mixture of gases.

What we claim is:—

1. The method of producing aliphatic alcohols from olefines comprising combining the olefine with water vapour at elevated temperature in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

2. The method of producing aliphatic alcohols from olefines comprising combining the olefine with water vapour at elevated temperature between 100° C. and 350° C. and at super-atmospheric pressure up to about 250 atmospheres in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

3. The method of producing ethyl alcohol comprising combining ethylene with water vapour at elevated temperature in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

4. The method of producing ethyl alcohol comprising combining ethylene with water vapour at elevated temperature between 100° C. and 350° C. in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

5. The method of producing ethyl alcohol comprising combining ethylene with water vapour at elevated temperature and at super-atmospheric pressure up to about 250 atmospheres in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

6. The method of producing ethyl alcohol comprising combining ethylene with water vapour at elevated temperature between 100° C. and 350° C. and at super-atmospheric pressure up to about 250 atmospheres, in the presence of a solid catalyst comprising essentially phosphoric acid and boron together with any of the metals taken from the group consisting of iron, copper, manganese, the amount of phosphoric acid present in the catalyst being in excess of that required to form the orthophosphates of the boron and of the group metal selected but not in so great an excess as to make the catalyst fluid.

7. The method of producing ethyl alcohol comprising combining ethylene with water vapour at elevated temperature in the presence of a solid catalyst comprising essentially phosphoric acid and boron together with any two of the metals taken from the group consisting of iron, copper, manganese, the amount of phosphoric acid present in the catalyst being in excess of that required to form the orthophosphate of the boron and the orthophosphates of the two group metals selected but not in so great an excess as to make the catalyst fluid.

WALTER PHILIP JOSHUA.
HERBERT MUGGLETON STANLEY.
JOHN BLAIR DYMOCK.